3,458,332
MICROSPHERE GLASS AGGLOMERATES AND
METHOD FOR MAKING THEM
Harvey E. Alford, Amherst, and Franklin Veatch, University Heights, Ohio, assignors, by mesne assignments, to Emerson & Cuming, Inc., Canton, Mass., a corporation of Massachusetts
No Drawing. Filed Mar. 25, 1966, Ser. No. 537,291
Int. Cl. C03c 11/00; C03b 19/06
U.S. Cl. 106—52     9 Claims

ABSTRACT OF THE DISCLOSURE

The process of producing agglomerates of ⅛ to ½ inch in diameter of hollow glass microspheres having diameters of 5–5000 microns and an alkalinity in the range from 0.103 to 0.192 milliequivalent per gram, comprising moistening the microspheres, agglomerating them to form loosely bonded agglomerates, and fusing the microspheres to each other at their points of contact.

---

This invention relates to a method of making agglomerates consisting essentially of hollow glass microspheres, and the agglomerates resulting from said method.

The microspheres treated in accordance with the method are conveniently of the type described in U.S. Patent 3,030,215 which issued Apr. 17, 1962. This patent is incorporated herein by reference to the extent necessary for a complete understanding of the microspheres, their properties and manufacture.

In general, however, it can be said that the present invention contemplates pelletizing hollow glass microspheres having diameters within the range of 5 to 5000 microns, gas densities within the range of 0.1 to 0.75, and wall thicknesses within the range of 0.5 to 10 percent of their diameters.

The hollow glass microspheres as described in U.S. Patent 3,030,215 are ideal for use as bulk thermal insulation, however, their small size makes them somewhat inconvenient to handle in this type of application. It has been discovered according to the present invention that a sequence of water addition, vibratory agitation, drying, and kiln firing can produce agglomerates, preferably ranging in size from about ⅛ to ½ inch and consisting essentially of hollow glass microspheres. However, not all glass microsphere particles will form satisfactory agglomerates. It has been found, unexpectedly, than an alkalinity of less than 0.17 milliequivalent per gram of glass particles and greater than 0.13 milliequivalent per gram of glass particles is required to produce satisfactory agglomerates.

The method is illustrated by the following block diagram:

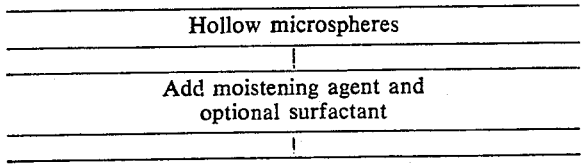

Description of the invention

In the preferred embodiment, regular production hollow glass microspheres, prepared according to the process described in U.S. Patent 3,030,215, are moistened with a minor proportion of water. Other materials, disclosed in U.S. Patent 2,797,201 which issued June 25, 1957, for making the microspheres are herein incorporated by reference. The added water may range from 1 weight percent of the total glass microsphere particles to about 20 weight percent. For the best results, it is preferred that the added water amount to between 3 weight percent and 8 weight percent of the total glass microspheres. It is not considered necessary to carry out the addition of water in the liquid state. It is also within the scope of the invention to accomplish this by exposure of the glass microspheres for the requisite length of time to an atmosphere of high relative humidity (70 percent or higher) such as, for instance, provided by the injection of steam into a vessel containing the glass microspheres. Also, it is within the scope of the invention to add small amounts of surfactants in this moistening step to increase the speed of the wetting action. Examples of such surfactants are the Duponol WN and the Duponol ME, derivatives of lauryl alcohol sulfates. The amount of surfactant required need not exceed 1 percent by weight of the total glass microspheres and should be, preferably, between ⅛ percent and ⅜ percent by weight.

The moistened glass microspheres are then placed on a vibrating table or screen, and, in a short period of time, roughly spherical agglomerates are formed. Alternately, the moistened microspheres are extruded and subdivided into agglomerates, which can then be spheroidized by vibrating them on a support surface. The ultimate size of the agglomerate particles is determined by the speed of vibration of the screen, the amount of moisture in the mixture, and the length of time the mixture is exposed to the vibrating action. For most purposes, the size of the roughly spherical agglomerate particles is preferably within the range of about ⅛ inch to about ½ inch in diameter. The method is capable of producing larger and smaller agglomerates, so that this particular size range is considered to be in no way limiting to the concept of the invention.

Other methods of forming the agglomerates are also contemplated. Thus, for instance, the moistened microspheres can be placed in a rotary kiln, and the ultimate size of the agglomerates would then be determined by the speed of rotation and the length of the kiln.

After the agglomerates are formed, they may be dried at room temperature, or, in the interest of reducing the overall time of processing, they may be placed in a low temperature oven and the temperature raised to a maximum of 250° F. over a period of 15 to 45 minutes. The dried agglomerates are then placed in a muffle furnace and heated at a temperature of 900 to 1100° F. for a period of 15 to 45 minutes, at the end of which time they are fused into a hard and durable product. The optimum time for this high temperature fusion step will depend in each case upon the size of the agglomerate which is being processed.

In the case of the use of the rotary kiln in the production of these agglomerates, it is possible to form and dry the agglomerates as a continuous operation in the same rotary kiln, by applying a gradually increasing temperature gradient from the feed to the discharge end. It is also possible to include the fusing step in the same kiln by providing a long enough kiln to accommodate the large thermal differences required.

In the course of the experimentation, it was noted that some batches of glass microspheres manufactured from a given feed material would not form agglomerates by the method of this invention, whereas other batches of glass microspheres manufactured under different spherulizing conditions (i.e., temperature, residence time, etc.) but from the same feed material formed excellent agglomerates by the method of this invention. In an effort to determine the reason for this difference, it was ascertained that the glass microspheres which would not agglomerate had an alkalinity of 0.192 milliequivalent per gram of glass microspheres, while the glass microspheres which did form agglomerates had an alkalinity of 0.166 milliequivalent per gram of the glass microspheres.

The alkalinity of the glass microsphere particles was determined by placing 10 grams of the glass microsphere particles in a 200-milliliter beaker, adding 100 milliliters of distilled water, stirring for 10 minutes and then allowing to stand for 10 minutes. A 10-milliliter aliquot of the clear liquid was then taken, diluted with an equal amount of distilled water and titrated with one-hundredth normal hydrochloric acid to a phenolphthalein end point.

Pursuing this further, samples of glass microspheres of varying alkalinities were obtained, and the ability of each of these glass microsphere samples to form satisfactory agglomerates was determined. The results, displayed in Table I below, show that the glass microsphere samples having alkalinity values above 0.17 milliequivalent per gram simply did not form agglomerates at all, while the glass microsphere samples having alkalinities below about 0.13 milliequivalent per gram formed only agglomerates which were weak and unsatisfactory.

TABLE I.—RELATION OF ALKALINITY TO AGGLOMERATE FORMATION

| Alkalinity, milliequivlent per gram | Agglomerate formation | Relative strength after drying (1=strongest) |
|---|---|---|
| 0.193 | Would not form | |
| 0.192 | Would not form | |
| 0.166 | Excellent | 1 |
| 0.146 | Fair | 2 |
| 0.135 | do | 4 |
| 0.125 | Weak | 5 |
| 0.123 | Fair | 3 |
| 0.103 | Weak | 5 |

These data show that the glass microsphere particles must have an alkalinity greater than 0.103 and less than 0.192 in order to form satisfactory agglomerates.

It is also within the scope of this invention to adjust the alkalinity of microspheres with acid or base as may be required to bring it within the above disclosed critical range.

Specific example of the invention

Glass microspheres were made by the process and in the equipment described in detail in U.S. Patent 3,129,086 which issued Apr. 14, 1964. The feed to the process was made from a mixture of 5.6 parts of boric acid, 100 parts of a commercially available sodium silicate having a solids content of 37.6 percent and a soda-to-silica ratio of 1 to 3.22, and 1 part of urea. The components of the feed were mixed thoroughly and the mixture placed in trays in a forced draft-drying oven and dried for a period of 11 hours at a temperature of 600° F. The dried feed material was removed from the oven, cooled, transferred from the trays to a hammer mill, comminuted, and screened. The particles larger than 40 mesh were recycled to the hammer mill and the particles smaller than 40 mesh were fed to the glass microsphere furnace. The properties of the dried feed material are listed in Table II.

Table II

Properties of dried glass microsphere feed material:
  Percent boron _____ 2.32
  Percent volatiles (1000° F., 1 hour) _____ 2.76
  Milliequivalent $NH_3$/gram _____ 0.94
  Density (gas) (grams/milliliter) _____ 2.08
  Density (loose bulk) (grams/milliliter) _____ .40
  Density (well tamped) (grams/milliliter) ____ .69

The glass microspheres produced from this feed were found to have an alkalinity of 0.166 milliequivalent per gram as determined by the method described in the preceding section.

One hundred parts by weight of the glass microspheres were mixed thoroughly with 3 parts by weight of water and the moistened microspheres placed on a 42-mesh screen. The screen was vibrated with at least a component of circular rotatory motion at a frequency of one cycle per second for a period of 15 seconds. At the end of this short time period, the glass microspheres had formed agglomerates, roughly spherical in shape, of approximately ⅛ inch in diameter. These moist agglomerates were then transferred to a low temperature-drying oven and maintained at a temperature of 250° F. for a period of ½ hour. After this time the dried agglomerates were placed in a muffle furnace and held at a temperature of 1000° F. for a period of ½ hour. After cooling, the agglomerates of glass microspheres were hard, durable, approximately spherical particles of average diameter of ⅛ inch, extremely well suited for handling, shipping and installation as bulk insulation.

We claim:

1. The process of producing microsphere agglomerates of ⅛ to ½ inch in diameter consisting essentially of hollow glass microspheres, having an alkalinity of $>0.13<0.17$ milliequivalent per gram of the microspheres, diameters within the range of about 5 to 5000 microns, wall thicknesses of from 0.5 to 10 percent of their diameters, and a gas density of 0.1 to 0.75, and having a composition of an alkali metal silicate, a metal oxide, and a blowing agent, comprising moistening the microspheres, agglomerating the moistened microspheres to form loosely bonded microsphere agglomerates, and fusing the microspheres to each other at their points of contact by subjecting them to a temperature of from 900° F. to 1100° F. for from 15 to 45 minutes, thereby forming durable microsphere agglomerates.

2. The process of claim 1 wherein prior to the fusion step, the loosely bonded microsphere agglomerates are dried at a temperature below the fusion point of the microspheres.

3. The process of claim 1 wherein the agglomerating step comprises vibrating the moistened microspheres with at least a component of circular motion to form loosely bonded microsphere agglomerates.

4. The process of claim 1 wherein a surfactant, selected from the group consisting of Duponol WN and the Duponol ME, is added to assist in the moistening of the microspheres.

5. The process of claim 2 wherein the drying is effected at a temperature not exceeding about 250° F. for a period of about 15 to 45 minutes.

6. The process of claim 1 wherein the fusion step is accomplished by gradually raising the temperature to the fusion point of the microspheres, whereby the loosely bonded microsphere agglomerates are dried, and fused to each other at their points of contact in a single continuous operation.

7. The process of claim 1 wherein the microspheres are moistened by the addition of 1 to 20 weight percent of water based on the weight of the microspheres.

8. The process of claim 4 wherein the surfactant is added in an amount not exceeding about 1 percent by weight based on the weight of the microspheres.

9. Microsphere agglomerates produced by the process of claim 1.

References Cited

UNITED STATES PATENTS

| | | | |
|---|---|---|---|
| 2,978,340 | 4/1961 | Veatch et al. | 65—21 |
| 3,061,495 | 10/1962 | Alford | 65—21 |

S. LEON BASHORE, Primary Examiner

E. R. FREEDMAN, Assistant Examiner

U.S. Cl. X.R.

65—21, 22, 142; 106—74, 75, 288; 156—89; 161—168